Aug. 26, 1958     G. R. DIXON     2,848,747
TUBE EXTRUSION
Filed Sept. 23, 1955
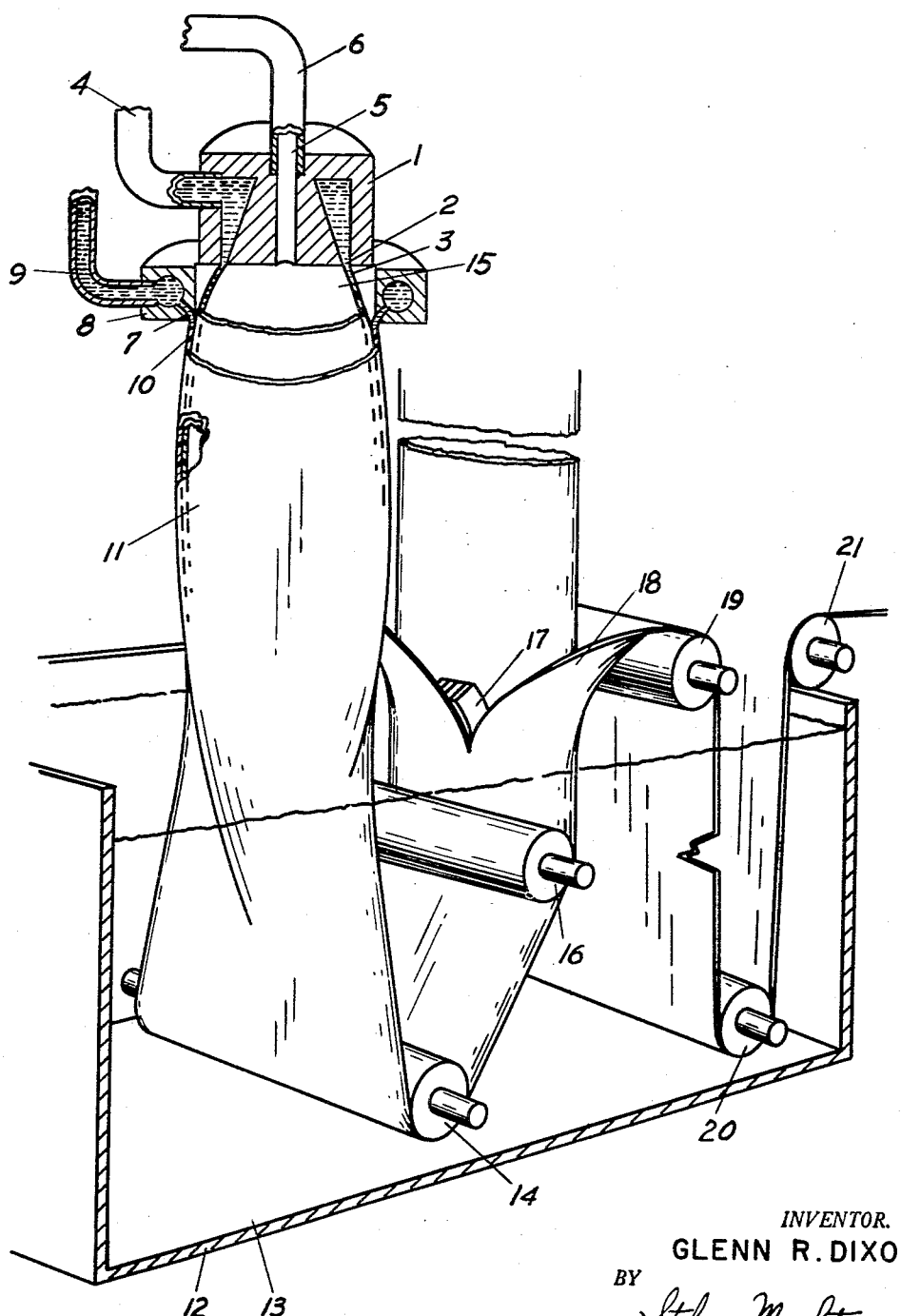
INVENTOR.
GLENN R. DIXON
BY
*Stefan M. Stein*
ATTORNEY

United States Patent Office 2,848,747
Patented Aug. 26, 1958

2,848,747
TUBE EXTRUSION

Glenn R. Dixon, Hamden, Conn., assignor to Olin Mathieson Chemical Corporation, New Haven, Conn., a corporation of Virginia Application September 23, 1955, Serial No. 536,129

4 Claims. (Cl. 18—47.5)

This invention relates to the extrusion of tubing and the product thereof, and more particularly to the extrusion of composite lay flat tubing which may subsequently be slit and separated into several layers of film.

It has long been known that cellulose film with improved physical characteristics could be made by casting on a heated surface. For instance in the casting of viscose, by heating the film immediately after it has been extruded to "dry cast" it, i. e., evaporate part of the liquid of the cellulose dispersion, improvements in its physical properties are obtained. The advantage gained by such casting is in part the result of the temperature used and in part the result of use of a support upon which the film is cast. The temperature is advantageous because it solidifies the film while the casting on a support is advantageous because it tends to prevent the film from shrinking. This tendency against shrinkage amounts to stressing the film in both the longitudinal and transverse direction thereby providing equal stresses in both directions to cause better structural orientation.

In the deposition of film from a cellulose dispersion, it is also known that certain advantages are obtainable by supporting the film while it is being coagulated. Here again the support acts to stress the film giving it better orientation.

It has also long been known that plastim material such as polyethylene, polyesters, polyamides and the like have the best physical characteristics when stretched both longitudinally and laterally. Stretching is most easily accomplished by extruding the plastic in the form of a tube and then expanding the tube over an air bubble, a mandrel or the like. The expansion causes both the desirable lateral and longitudinal stretching. The tube is subsequently slit into a continuous sheet.

In the casting of cellophane, heat may be used to cause evaporation of part of the liquid of the cellulose dispersion. In the extrusion of plastic lay flat tube, a large amount of heat must be dissipated to cool the tube. Also, in both processes, the stretching or tentering of the material will improve the physical charcteristics of the film.

An object of this invention is to provide a method for the simultaneous making of cellulose and thermoplastic film. Another object of this invention is to provide a method in which thermoplastic tubing is used as a support for the dry casting of a cellulose dispersion. And another object of this invention is to provide a method for the making of cellulose film wherein the inherent transverse and lateral shrinkage of the film is kept at a minimum. A further object of this invention is to provide a method for improving the physical characteristics of cellulose film by a novel simple stretching technique. Another object of this invention is to provide a novel cooling technique for the extrusion of thermoplastic tubing. Another object of this invention is to provide a method for the fixation of cellulose as a film while it is on a support. Another object of this invention is to produce a composite tube of cellulose and thermoplastic layers. Another object of this invention is to provide a method wherein the normally wasted heat energy of plastic tube extrusion is used to advantage in the making of cellulose film. And another object of this invention is to provide a support for the casting of cellulose film which is easily strippable therefrom. Other objects will become apparent to those skilled in the art upon reading the following detailed description and drawing in which a broken perspective view of an embodiment of an extrusion apparatus and regeneration and/or cooling tank for accomplishing the objects enumerated above is shown.

Broadly speaking, the objects of the invention are achieved by providing a novel method of extruding and dry casting cellulose tubing upon a heated tube of thermoplastic material. More particularly speaking, the objects of this invention are accomplished by extruding and casting cellulose tubing upon a tube of thermoplastic material which has been extruded just prior to the extrusion of the cellulose. The cellulose tube is cast onto the hot thermoplastic tube using the heat of the freshly extruded plastic tube to dry cast the cellulose dispersion. The cellulose tube in turn cools the hot tube. Subsequently, the composite tube is passed through a regeneration and/or cooling bath. The cellulose is regenerated and the plastic tubing is cooled. The outer or cellulose layer of the tube may then subsequently be slit by a slitting knife of particular shape and removed from the thermoplastic tube. Subsequently, the plastic tube may also be slit to form plastic film.

Referring to the drawing which illustrates a preferred embodiment of this invention, there is shown an extruder diehead 1, having an extrusion slit 2, from which thermoplastic tube 3 is extruded as a hot melt. The melted thermoplastic material is supplied to the diehead 1, by means of inlet 4. The inlet may be jacketed by a heating mantel in order to keep the temperature of the melted plastic constant. The extruder diehead may also have heating means therein or thereon to prevent undesirable cooling of the melted plastic. Vent 5 extends axially through the diehead. An air or gas conduit 6 leading from a constant pressure source is connected to the vent 5.

Situated from the plane of the thermoplastic tube extrusion slit is an annular and concentric cellulose extrusion orifice 7. The cellulose is in the form of a dispersion such as viscose. The orifice is contained within a circular ring diehead 8 which is fed by inlet 9. The diehead may, if necessary, contain cooling coils to keep the dispersion cool. A thin film 10 of cellulose in tubular form is cast from the orifice or slit 7 directly onto the thermoplastic tube that has just be extruded. Since the thermoplastic tube is still hot, the cellulose dispersion will be dry cast while the thermoplastic film will be cooled by the dispersion. The resulting composite tube 11 then travels into a tank 12, containing a standard cellulose regeneration bath 13. The bath regenerates the cellulose to form a cellulose tube.

The composite tube, after being formed, rides over a seal roll 14, which acts to seal the air bubble 15 maintained within the composite tube from venting to the atmosphere. The pressure inside the air bubble is sufficient to cause expansion of the composite tube. This expansion effects a lateral and a longitudinal stretching of the composite tube thereby imparting improved physical characteristics to materials of the tube. Longitudinal stretching is additionally performed by increasing the tension on the film, that is having a faster windup speed than the extrusion speed.

The composite tube subsequently passes over a guide roll 16, after which it comes into contact with a slitting knife 17. The slitting knife is so shaped that the cellulose layer of the composite tube will be slit while the thermoplastic layer will remain intact. The slit cellulose film 18 is directed toward guide rolls 19, 20 and 21 which cause the film to again pass through the regeneration bath 13. The thermoplastic tube is directed away from the path of the slit cellulose film 18 and may either be wound up as is, or subsequently slit and wound as a film upon a windup roll.

Obviously, the apparatus and method described above is useful for extruding tubes of various polymeric materials. The cellulose layer may consist of regenerated cellulose from either a viscose (such as disclosed in U. S. 646,044) or a cuproammonium solution (such as disclosed in U. S. 1,728,565). With respect to the thermoplastic layer, polyethylene, polyesters, polyamides and the like are useful. The thermoplastic layer should be inert to the cellulose layer, easily strippable therefrom if separation of the layers is desired and capable of being heated so as to act as a casting base for the cellulose. Modifications to the material used may be made such as the incorporation of heat stabilizers, plasticizers, dyes and the like.

With respect to the manner of extrusion, modifications can be made in the technique disclosed without departing from the scope of this invention. For example, the tube may be extruded upwardly and then by proper positioning of the seal and guide rolls, the tube can be directed into baths. The gas pressure employed in the expansion of the tube will naturally depend upon the gauge (thickness) of the extruded tubes and upon the degree of expansion desired.

With respect to the medium used in the tank 12, a standard cellulose regeneration solution (such as described in U. S. 981,368) may be used.

Obviously, other modifications can be made in the invention described without departing from the spirit and scope of this invention.

The invention having thus been described what is desired to be secured by Letters Patent is as follows:

1. A method for producing cellulose film comprising continuously casting a cellulose film forming solution upon a newly extruded thermoplastic tube, expanding the composite tube and cast film, utilizing the heat inherent in the newly extruded tube to dry the film upon said tube, slitting the cellulose film and stripping it from the thermoplastic tube.

2. A method for producing regenerated cellulose film comprising continuously casting a viscose solution upon a continuously advancing heated thermoplastic tube, utilizing the heat of said tube to dry the solution into a continuous casing about the tube, expanding the tube and the casing simultaneously, passing said coated tube through a regeneration bath to regenerate the viscose, slitting the casing and stripping the casing from the thermoplastic tube.

3. A method for producing cellulose film and thermoplastic film simultaneously comprising extruding a melted thermoplastic material through an annular die to develop a tube, casting a cellulose film forming solution upon said extruded tube immediately after extrusion, expanding said tube while allowing the cellulose to dry into a film, slitting the film, stripping the film from the thermoplastic tube and subsequently slitting the thermoplastic tube into a continuous sheet.

4. A method for producing regenerated cellulose film and thermoplastic film simultaneously comprising extruding a thermoplastic material through an annular die to develop a tube, casting a viscose solution upon said tube immediately after extrusion, expanding said tube while allowing the viscose to dry into a film, passing said tube through a cellulose regeneration bath, slitting the regenerated cellulose film, stripping the film from the thermoplastic tube and subsequently slitting the thermoplastic tube into a continuous sheet.

References Cited in the file of this patent

UNITED STATES PATENTS

| | | |
|---|---|---|
| 2,043,172 | Hewitt | June 2, 1936 |
| 2,175,099 | Abbott | Oct. 3, 1939 |
| 2,358,376 | Banigan et al. | Sept. 19, 1944 |
| 2,461,976 | Schenk | Feb. 15, 1949 |
| 2,545,300 | Nixon | Mar. 13, 1951 |
| 2,574,555 | Galloway | Nov. 13, 1951 |
| 2,592,658 | Colombo | Apr. 15, 1952 |
| 2,597,806 | Martin | May 20, 1952 |
| 2,609,002 | Meissner | Sept. 2, 1952 |
| 2,730,762 | Ballard | Jan. 17, 1956 |
| 2,739,351 | Henning | Mar. 27, 1956 |